United States Patent

Czajkowski

[19]

[11] Patent Number: 6,025,700
[45] Date of Patent: Feb. 15, 2000

[54] ALTERNATOR REGULATOR

[75] Inventor: François Czajkowski, Linars, France

[73] Assignee: Moteurs Leroy-Somer, Angouleme, France

[21] Appl. No.: 08/944,557

[22] Filed: Oct. 7, 1997

[30] Foreign Application Priority Data

Oct. 18, 1996 [FR] France .................................. 96 12707

[51] Int. Cl.[7] .................................................. H02P 9/10
[52] U.S. Cl. ................................ 322/59; 322/60; 322/37; 322/86
[58] Field of Search ................................ 322/22, 37, 45, 322/59, 60, 86

[56] References Cited

U.S. PATENT DOCUMENTS

| 3,500,165 | 3/1970 | Takada et al. | 320/1 |
| 4,100,440 | 7/1978 | Binder et al. | 310/89 |
| 4,326,159 | 4/1982 | Aotsu et al. | 322/19 |
| 4,463,306 | 7/1984 | De Mello et al. | 322/25 |
| 4,677,364 | 6/1987 | Williams et al. | 322/47 |
| 5,294,879 | 3/1994 | Freeman et al. | 322/23 |
| 5,604,420 | 2/1997 | Nambu | 322/19 |
| 5,754,033 | 5/1998 | Thomson | 322/45 |

FOREIGN PATENT DOCUMENTS

| 0 233 425 | 8/1987 | European Pat. Off. . |
| 0 615 180 | 9/1994 | European Pat. Off. . |
| WO 96/10288 | 4/1996 | WIPO . |

*Primary Examiner*—Nicholas Ponomarenko
*Attorney, Agent, or Firm*—Young & Thompson

[57] ABSTRACT

A regulator for a brushless synchronous alternator that includes a rotary exciter having a stationary excitation inductor. The regulator includes, in combination, a power stage connected to the alternator, an analog regulator circuit connected to the power stage to regulate a plurality of parameters, a digital regulator circuit connected to the power stage to regulate a plurality of parameters, and a control circuit designed to enable the regulator unit to operate in two modes: a normal mode in which the regulation function is performed by the digital regulator circuit and a fault mode in which the regulation function is performed by the analog regulator circuit. The digital regulator circuit is isolated from the alternator, in particular mechanically and/or magnetically, and is connected to the control circuit via insulated electrical connections.

6 Claims, 2 Drawing Sheets

ALTERNATOR REGULATOR

The present invention relates to a regulator unit for a brushless synchronous alternator comprising a rotary exciter having a stationary excitation inductor, for regulating a plurality of parameters, in particular excitation current, alternator output voltage, open circuit voltage, short circuit current, power factor, and alternator magnetic state.

BACKGROUND OF THE INVENTION

Alternator regulator units are known that include a power stage connected to the alternator, and a regulator circuit connected to the power stage for regulating said parameters.

In a first prior art embodiment, e.g. known from document EP-A-0 223 425, the regulator circuit is an analog circuit using both the voltage of the fundamental and the voltage of the third harmonic of the alternator to perform regulation.

The analog regulator circuit has the advantage of being insensitive to large powers and to mechanical vibration, thereby enabling it to be placed on the case of the alternator.

However, in the present case of regulating a plurality of parameters, analog circuits generally suffer from the drawback of performing limited functions.

In another prior art embodiment, e.g. known from document U.S. Pat. No. 5,294,879, the regulator circuit is a digital circuit which is not positioned on the alternator case.

Although the digital circuit has the advantage of performing a considerable number of functions, it suffers from the drawbacks of being particularly sensitive to mechanical or magnetic vibration and thus of being unsuitable for placing on the case of the alternator.

Consequently, it is necessary to provide connections between the alternator proper and the regulator circuit, thereby running the risk of such connections becoming damaged.

OBJECTS AND SUMMARY OF THE INVENTION

The invention seeks to mitigate the above-mentioned drawbacks.

To this end, the invention provides an alternator regulator unit enabling the performance obtained using an analog circuit to be improved while making use of the performance obtained by means of a digital circuit.

In other words, the object of the invention is to keep the initial reliability of the analog circuit in a backup position while being capable of making as much use as possible of the performance of a digital circuit.

To this end, the invention provides a regulator unit for a brushless synchronous alternator comprising a rotary exciter having a stationary excitation inductor, and comprising in combination:

a power stage connected to the alternator;

an analog regulator circuit suitable for being connected to the power stage, to regulate a plurality of parameters, in particular excitation current, alternator output voltage, open circuit voltage, short circuit current, power factor, and alternator magnetic state;

a digital regulator circuit suitable for being connected to the power stage, to regulate a plurality of parameters, in particular alternator output voltage, open circuit voltage, short circuit current, and alternator magnetic state; and a control circuit designed to enable the regulator unit to operate in two modes: a normal mode in which the regulation function is performed by the digital regulator circuit, and a "fault" mode in which the regulation function is performed by the analog regulator circuit;

the digital regulator circuit being isolated from the alternator, in particular mechanically and/or magnetically, and being connected to the control circuit by insulated electrical connections.

Also, in normal mode, the digital regulator circuit can control the power stage.

As mentioned above, to improve the reliability of the unit, the digital regulator circuit is mounted in a housing that is distinct from the alternator while the analog regulator circuit is positioned on the case of the alternator.

In one embodiment, the control circuit comprises:

an analog/digital control unit designed to receive information from the analog and the digital regulator circuits; and a switch controlled by the control unit so as to set the regulator unit to normal mode or to fault mode as a function of said received information.

The switch may also be positioned on the alternator while the control unit is isolated, in particular mechanically and/or magnetically from the alternator.

In another embodiment, the digital regulator circuit is suitable for performing regulation parameter by parameter.

It may also include priority management means suitable for causing a change of parameter to be performed as a function of such priorities, together with means, with hierarchical access, for managing multilevel threshold protection.

Insofar as the switch is positioned on the alternator, it may be of the analog small signal type.

In another embodiment, the control unit may include detector means for detecting faulty operation of the digital regulator circuit, the control circuit causing the regulator device to switch from normal mode to fault mode in the event of such detection.

The regulator unit of the invention may also include status-indicator means, in particular concerning its operating mode and/or the programming parameters.

BRIEF DESCRIPTION OF THE DRAWINGS

Other characteristics of the invention appear from the following description of embodiments given in non-limiting manner with reference to the accompanying drawings, in which.

DETAILED DESCRIPTION OF THE PREFERRED EMBODIMENT

Figure 1:
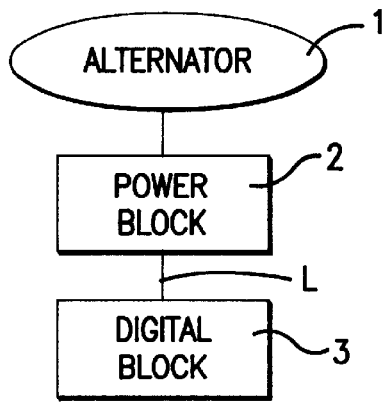
FIG. 1 is a highly diagrammatical block diagram for a regulator unit of the invention.
Figure 2:
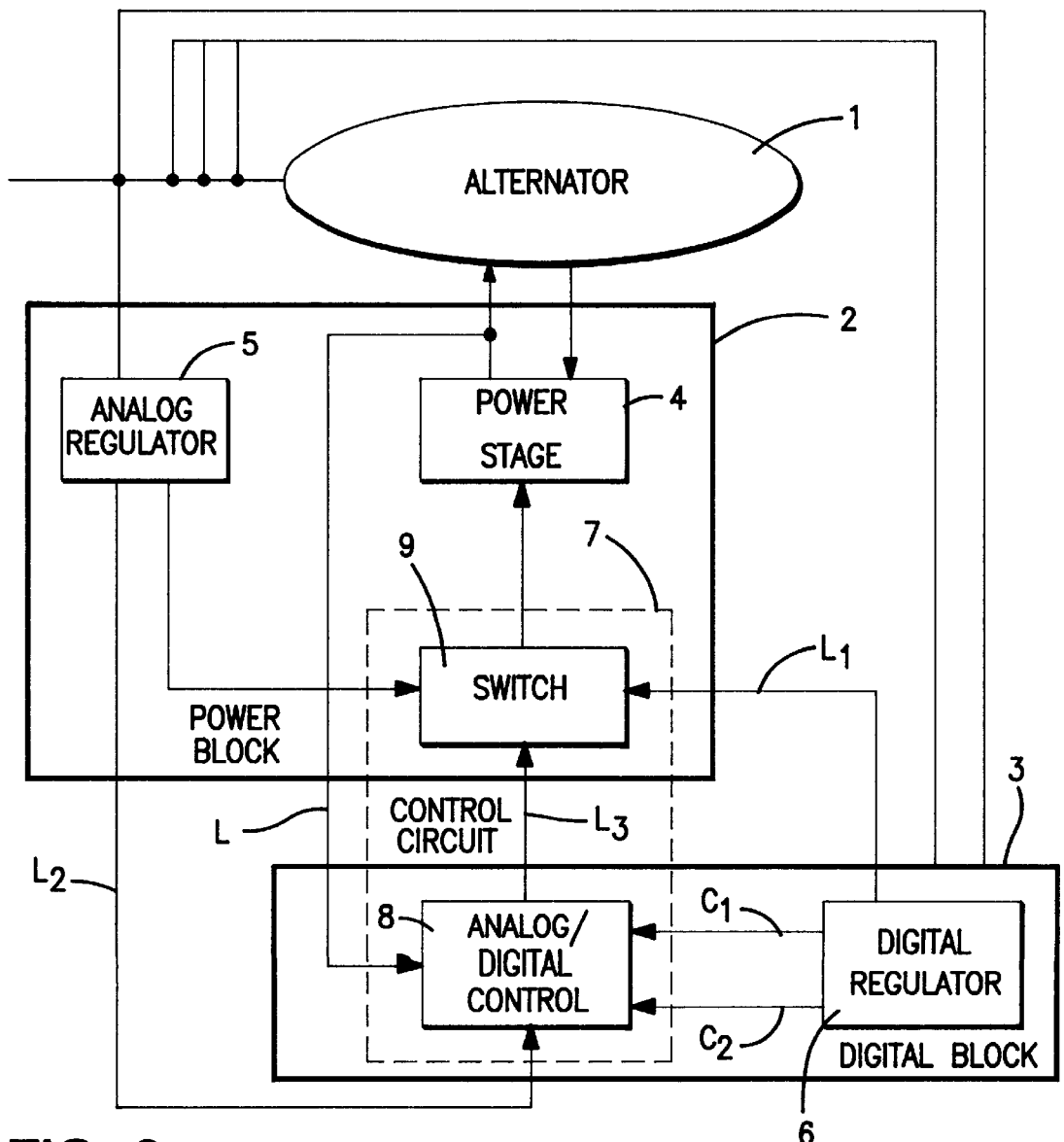
FIG. 2 is a more detailed block diagram of a regulator unit of the invention.

The invention relates to a digitally controlled multifunction regulator unit for an alternator 1 that is designed to be fitted specifically to low voltage machines including an excitation system, for example the system described in patent EP-A-0 233 425.

The regulator unit comprises a power block 2 and a control block or digital block 3.

These two blocks 2 and 3 are interconnected by insulated electrical connections L, and L1 to L3, these connections conveying in particular analog electrical signals at low voltage and/or low frequency.

The regulator device is designed to operate in two modes: a "normal" mode in which the regulation function is performed by the digital block 3; and a "fault" mode in which the regulation function is performed by the power block 2.

The power block 2 must be capable of independent analog operation so as to perform the regulation function in fault mode in the event of the digital block failing or missing, or in the event of any of the connections L, and L1 to L3 with the digital block 3 being cut.

Consequently, the power block 2 can be positioned on the alternator 1, e.g. in its terminal box, and it can be subjected to environmental stresses that are acceptable to analog regulators.

To this end, the power block 2 includes a power stage 4 connected in known manner to the stationary excitation inductor of the alternator.

This power stage 4 is also connected to an analog regulator circuit 5 which is designed to regulate several parameters, for example such as alternator excitation current, alternator output voltage, open circuit voltage, short circuit current, power factor, or alternator magnetic state.

In particular, the analog regulator circuit 5 can be of the type described in European patent application EP-A-0 233 425. As explained therein, circuit 5 may comprise two monophased auxiliary coils housed in a stator to supply the stationary excitation inductor of the alternator. These coils receive the fundamental voltage and the third harmonic voltage from the alternator, respectively.

The current supplying the excitation inductor is regulated as a function of the fundamental and harmonic voltages and the output voltage of the alternator, so as to regulate selectively several parameters such as the output voltage, the open circuit voltage, the short circuit current and the alternator magnetic state.

It operates only in fault mode.

In contrast, the digital block 3 must not be subjected to the environmental stresses that can be accepted by analog regulators.

Consequently, it is mounted in a housing that is distinct from the alternator.

To enable operation in normal mode to take place, the digital block 3 has a digital regulator circuit 6 connected in conventional manner to the stationary excitation inductor of the alternator, to regulate a plurality of parameters, in particular such as alternator output, open circuit voltage, short circuit current, and magnetic state of the alternator, said circuit 6 being suitable for being connected in normal mode to the power stage 4 via a first insulated line L1.

The digital block 3 also has a control circuit 7 connected firstly to the digital regulator circuit 6 and secondly, via a second insulated line L2, to the analog regulator circuit 5.

The purpose of the control circuit 7 is to cause the regulator unit of the invention to switch from normal mode to fault mode, and vice versa, as a function of the information received from the digital regulator circuit 6 and from the analog regulator circuit 5.

To this end, the control circuit 7 includes an analog/digital control unit 8 connected both to the analog regulator circuit 5 via the insulated link L2, and to the digital regulator circuit 6 via links C1 and C2.

The control circuit 7 also has a switch 9 connected both to the control unit 8 and to the analog and digital regulator circuits 5 and 6.

The switch 9 is controlled by the control unit 8 so as to position the regulator unit of the invention in normal mode or in fault mode as a function of said received information.

In one embodiment, the switch 9 is of the small signal analog type.

Thus, it can be positioned on the alternator 1, while the control unit is isolated from the alternator 1, particularly mechanically and/or magnetically.

To this end, the control unit 8 is connected to the switch 9 via an insulated link L3.

For example, provision may be made for the switch 9 to be contained in the power block 2.

Thus, to switch to fault mode, it suffices for at least one of the links L1 to L3 between the digital block 3 and the power block 2 to be interrupted, with alternator regulation then being performed via the analog regulator circuit 5.

In contrast, in normal mode, the digital regulator circuit 6 controls the power stage 4 via the isolated line L1 and the switch 9.

In one embodiment, the digital regulator circuit 6 is suitable for performing regulation, parameter by parameter.

To this end, it includes priority control means 10 suitable for changing parameter as a function of predetermined priorities.

The management means 10 are connected by means of an interface 11 to a parameter memory 12, with the interface 11 possibly being implemented by a serial link 13, e.g. of the RS232 type, for external connection.

In addition, the digital regulator circuit 6 includes means, with hierarchical access, for managing multilevel threshold protection.

Also, to make it possible to switch from normal mode to fault mode, the control unit 8 includes detector means for detecting faulty operation of the digital regulator circuit 6, with switching from normal mode to fault mode being performed in the event of such detection taking place.

Finally, the regulator unit of the invention may include status indicator means 14, for indicating in particular the operating mode and/or the programming parameters.

Figure 3:
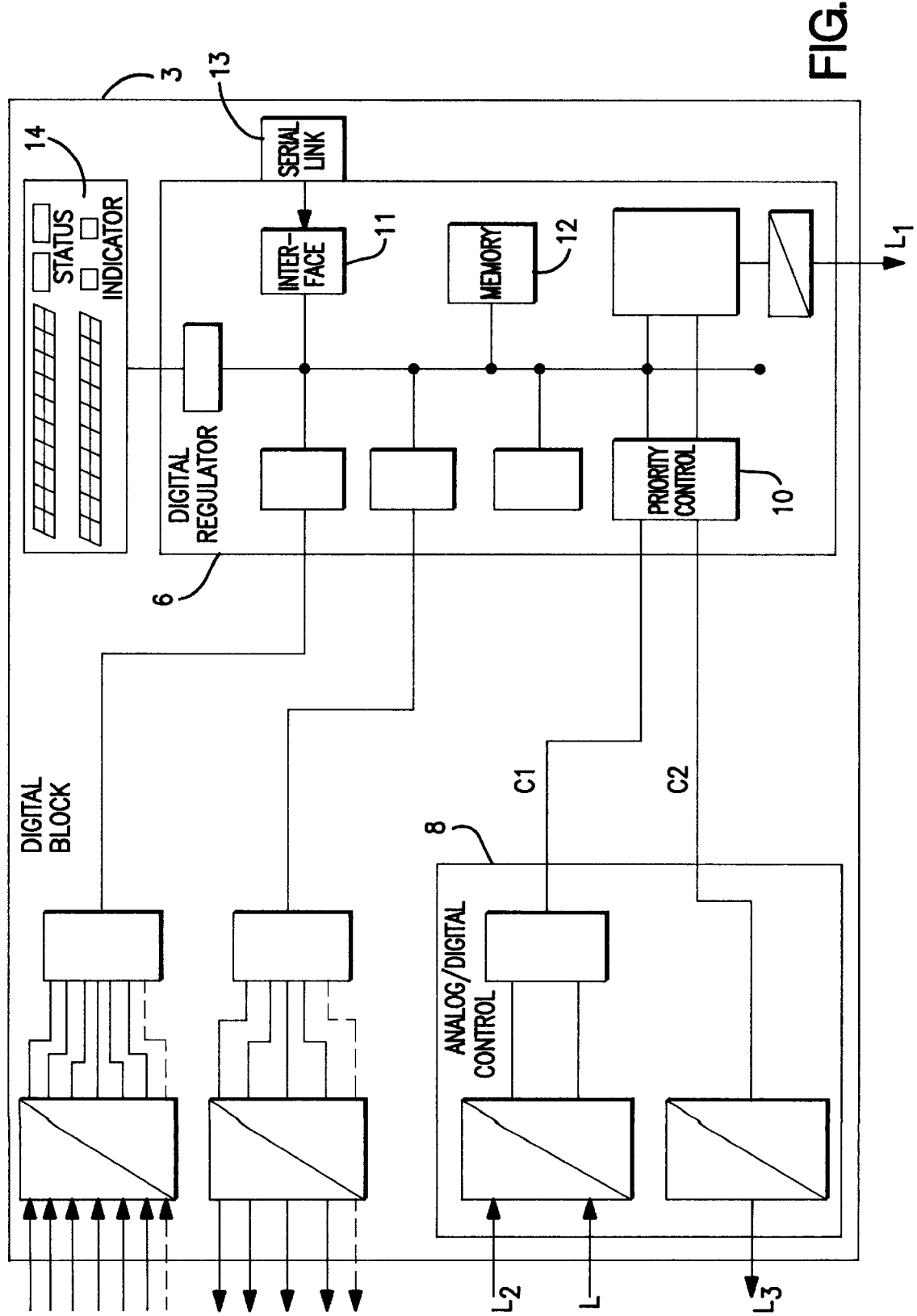
FIG. 3 is a diagram of a digital block for a regulator unit of the invention.

The other circuits of the digital block 3 shown in FIG. 3 are not described in detail since they are usually present in digital regulators known in the prior art.

By way of example, they comprise detector circuits, protection circuits, interfaces, digital-to-analog converters, etc.

I claim:

1. A regulator for a brushless synchronous alternator that has a rotary exciter with a stationary excitation inductor comprising:

a power stage connected to the alternator to control said alternator excitation;

an analog regulator circuit that is selectively connected to said power stage under fault conditions and regulates said excitation current by receiving inputs of an alternator output voltage, an open circuit voltage, and a power factor;

a digital regulator circuit that is selectively connected to said power stage and under normal conditions regulates said excitation current by receiving inputs of an alternator output voltage, an open circuit voltage, and a power factor, where said digital regulator circuit being arranged and constructed to be isolated from mechanical vibrations of the alternator; and a control circuit that is connected to said digital regulator circuit and to said analog regulator circuit, said control circuit being arranged and constructed to operate in a normal mode when said digital regulator circuit is operational, and in a fault mode when said analog circuit is operational, where said control circuit selectively connecting said digital regulator circuit to said power stage in said normal mode and said analog regulator circuit to said power stage in said fault mode by receiving a system fault signal.

2. The regulator of claim 1, wherein said power stage and said analog regulator circuit are arranged and constructed to be mounted on the alternator and said digital regulator is arranged and constructed to be mounted spaced from the alternator.

3. The regulator of claim 1, wherein said control circuit comprises an analog/digital control unit for receiving operating information from said digital regulator circuit and said analog regulator circuit and for setting one of said normal mode and said fault mode, and a switch for selectively connecting one of said analog regulator circuit and said digital regulator circuit to said power stage responsive to said analog/digital control unit.

4. The regulator of claim 3, wherein said switch is arranged and constructed to be mounted on the alternator and said analog/digital control unit is arranged and constructed to be mounted spaced from the alternator, said switch being connected to said analog/digital control unit by an insulated electrical connection.

5. The regulator of claim 3, wherein said switch is an analog small signal switch.

6. The regulator of claim 1, further comprising a status indicator for indicating an operating status of said digital regulator circuit.

* * * * *